(12) United States Patent
Smalyukh et al.

(10) Patent No.: US 12,345,909 B2
(45) Date of Patent: Jul. 1, 2025

(54) TEMPLATED MATERIALS, STRUCTURES INCLUDING THE MATERIALS, AND METHODS OF USING AND FORMING SAME

(71) Applicant: The Regents of the University of Colorado, Denver, CO (US)

(72) Inventors: Ivan I. Smalyukh, Boulder, CO (US); Andrew Johnston Hess, Louisville, CO (US); Qingkun Liu, Boulder, CO (US); Joshua A. De La Cruz, Denver, CO (US); Blaise Fleury, Boulder, CO (US); Eldho Abraham, Boulder, CO (US); Bohdan Senyuk, Boulder, CO (US); Vladyslav Cherpak, Westminster, CO (US)

(73) Assignee: The Regents of the University of Colorado, Denver, CO (US)

( * ) Notice: Subject to any disclaimer, the term of this patent is extended or adjusted under 35 U.S.C. 154(b) by 1145 days.

(21) Appl. No.: 17/251,675

(22) PCT Filed: Jun. 13, 2019

(86) PCT No.: PCT/US2019/037121
§ 371 (c)(1),
(2) Date: Dec. 11, 2020

(87) PCT Pub. No.: WO2019/241602
PCT Pub. Date: Dec. 19, 2019

(65) Prior Publication Data
US 2021/0247557 A1 Aug. 12, 2021

Related U.S. Application Data

(60) Provisional application No. 62/684,683, filed on Jun. 13, 2018.

(51) Int. Cl.
*G02B 5/30* (2006.01)
*G02B 1/08* (2006.01)

(52) U.S. Cl.
CPC ............ *G02B 5/3083* (2013.01); *G02B 1/08* (2013.01)

(58) Field of Classification Search
CPC ...... G02B 5/3083; G02B 1/08; G02B 5/0816; G02B 5/3008; G02B 5/3016; C08L 1/04; C09K 19/586
See application file for complete search history.

(56) References Cited

U.S. PATENT DOCUMENTS

| | | | | |
|---|---|---|---|---|
| 2007/0159671 A1* | 7/2007 | Hoshino | ............. | G02B 5/3016 359/2 |
| 2011/0248214 A1* | 10/2011 | Maclachlan | ....... | B01D 67/0048 977/840 |
| 2014/0295161 A1* | 10/2014 | MacLachlan | ...... | C09K 19/3819 423/445 R |
| 2017/0097530 A1* | 4/2017 | Tsao | ...................... | G02F 1/1335 |

* cited by examiner

*Primary Examiner* — Ryan D Howard
(74) *Attorney, Agent, or Firm* — Snell & Wilmer L.L.P.

(57) ABSTRACT

Materials that can be templated by one or more of biological material and biologically-derived material, structures including such materials, and methods of forming and using the materials and structures are disclosed. Exemplary materials and structures can be used to reflect, polarize and/or retard electromagnetic radiation.

14 Claims, 9 Drawing Sheets

TEMPLATED MATERIALS, STRUCTURES INCLUDING THE MATERIALS, AND METHODS OF USING AND FORMING SAME

CROSS-REFERENCE TO RELATED APPLICATIONS

The present disclosure is the national stage entry of International Application No. PCT/US19/37121, filed Jun. 13, 2019, and entitled TEMPLATED MATERIALS, STRUCTURES INCLUDING THE MATERIALS, AND METHODS OF USING AND FORMING SAME, and claims the benefit of U.S. Provisional Patent Application No. 62/684,683, filed on Jun. 13, 2018, and entitled CHOLESTERICALLY ORDERED NANOCELLULOSE FILMS FOR THE REFLECTION OF RADIATION AND POLYMER TEMPLATING, which is incorporated herein by reference.

STATEMENT REGARDING FEDERALLY SPONSORED RESEARCH OR DEVELOPMENT

This invention was made with government support under Award No. DE-AR0000743 awarded by the U.S. Department of Energy. The government has certain rights in the invention. This invention was also made with support under grant number DMR1410735 awarded by the National Science Foundation which also has certain rights in the invention.

FIELD OF DISCLOSURE

The present disclosure generally relates to materials that can be templated by one or more of biological material and biologically-derived material, to structures including such materials, and to methods of forming and using same. Exemplary materials and structures can be used to reflect and/or retard electromagnetic radiation.

BACKGROUND OF THE DISCLOSURE

Photonic crystals enable a host of practical applications such as nonlinear waveguides, advanced anticounterfeiting structures, and low-energy-consuming displays; however, the bulk of these material systems are typically prepared via top-down methods such as deposition of materials, photo- and electron-lithography, and etching. Nanofabrication affords precise control over structures, but is obtained at the cost of detrimentally impacting scalability and throughput, hampering economic feasibility, and ultimately limiting such materials' practical scope. Accordingly, improved materials and structures and methods of forming the materials and structures are desired.

Any discussion of problems and solutions described in this section has been included solely for the purposes of providing a context for the present invention and should not be taken as an admission that any or all of the discussion was known at the time the invention was made.

SUMMARY OF THE DISCLOSURE

The present disclosure generally relates to materials that can be templated with one or more of biological material and biologically-derived material, such as cellulose, and to methods of forming and using the materials. As set forth in more detail below, exemplary materials and structure described herein can be used for a variety of applications, including reflection and/or retardation of electromagnetic radiation in the visible to near infrared (IR) spectra.

In accordance exemplary embodiments of the disclosure, a cholesteric reflective material is provided. The cholesteric reflective material is templated by one or more of biological material and biologically-derived material, such that the cholesteric reflective material comprises a chiral nematic (aka cholesteric) structure. In accordance with some aspects of these embodiments, the cholesteric reflective material comprises or consists of the one or more of biological material and biologically-derived material. In accordance with other aspects, the cholesteric reflective material can comprise or consist of other materials, such as silica, organosilica material, titanium oxide, and one or more polymers, or the like. By way of examples, the one or more of biological material and biologically-derived material can include one or more of cellulose nanomaterial, chitin nanomaterial (e.g. chitan nanocrystals) and chitosan nanomaterial (e.g. chitosan nanocrystals). The cellulose nanomaterial can include, for example, sulfonated cellulose material. The cholesteric reflective material can include one or more of additives to modify material properties. The cholesteric reflective material can circularly and/or elliptically polarize visible and near-infrared electromagnetic radiation and/or reflect incident visible and near-infrared electromagnetic radiation. In accordance with further aspects of these embodiments, the wavelengths of electromagnetic radiation reflected by the cholesteric reflective material can be determined by concentrations of compounds in the composition of the cholesteric reflective material, without changing (e.g., the identity of) the compounds.

In accordance with additional exemplary embodiments of the disclosure, a retarder material is provided. The retarder material can be templated by one or more of biological material and biologically-derived material, wherein the retarder material comprises a non-chiral nematic structure. The biologically-derived material comprises one or more of cellulose nanomaterial, chitin nanomaterial and chitosan nanomaterial. The retarder material can include one or more layers, wherein each layer includes aligned nanomaterial. The nanomaterial within a layer and/or within different layers can be sourced from different biological sources, such as plants, animals and microorganisms. The nanomaterial can be aligned using, for example, a shear force applied to the material.

In accordance with further exemplary embodiments of the disclosure, a structure is provided. The structure can include reflective material and/or retarder material, such as the reflective material and/or retarder material described herein. As set forth in more detail below, the structures can include various configurations.

BRIEF DESCRIPTION OF THE DRAWING FIGURES

A more complete understanding of exemplary embodiments of the present disclosure may be derived by referring to the detailed description and claims when considered in connection with the following illustrative figures.

Figure 3:
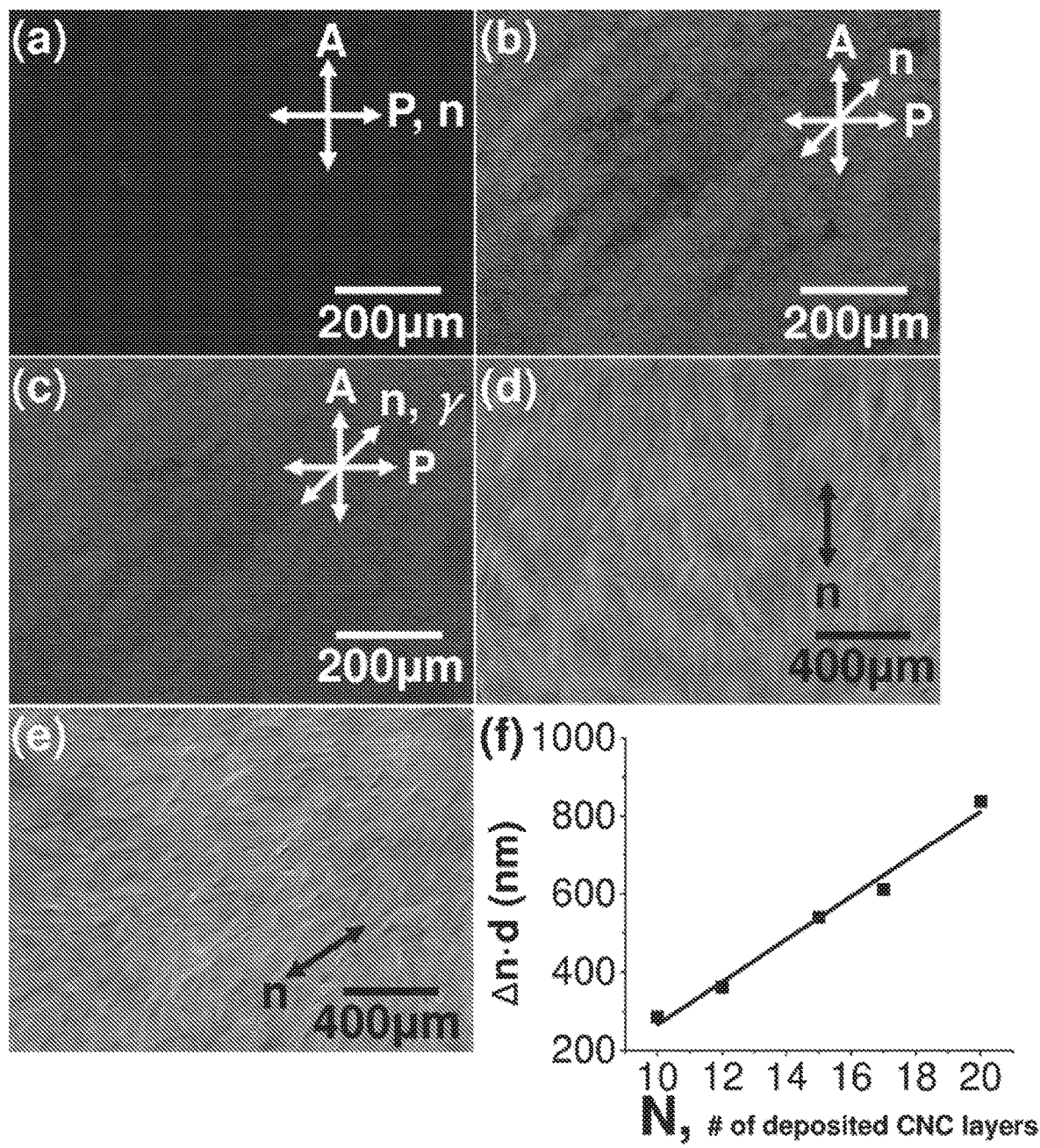

FIG. 3 illustrates polarized optical micrographs of the CNC-based retardation plates with the director oriented (a) parallel to the polarizer and (b, c) +45° with respect to the polarizer (b) before and (c) after insertion of a 530 nm retardation plate. Scanning electron micrographs taken along the direction normal to the shear plane for the films with both (d) bacterial CNCs and (e) cotton CNCs, showing unidirectional alignment along the shear direction. The CNC director has orientation denoted by the double-headed arrow labeled n. (f) Linear relation of Δn(d) vs the number of deposited CNC layers N of an unidirectionally aligned nematic-like bacterial CNC wave plate.

Figure 4:
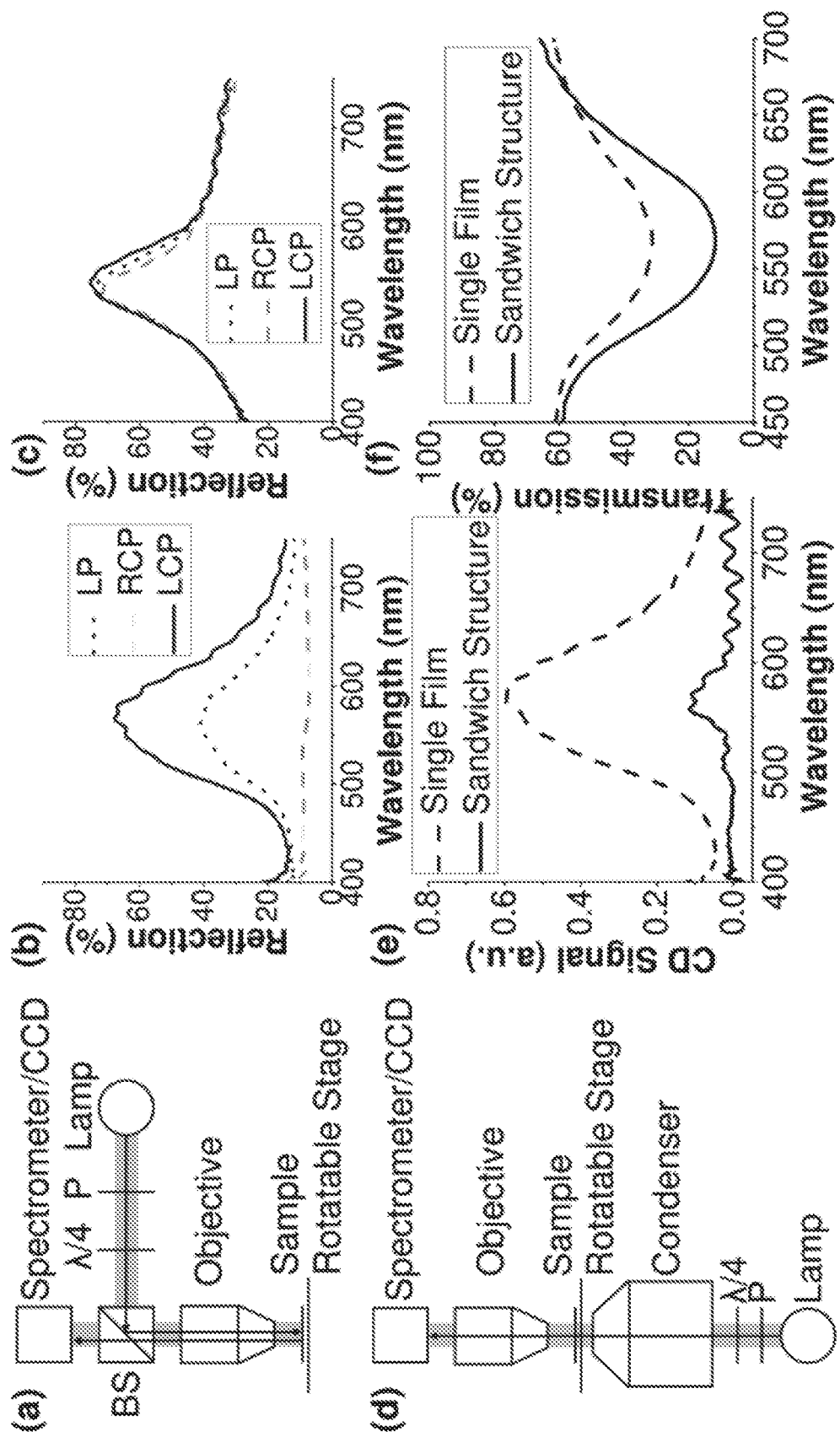

FIG. 4 illustrates (a) optical setup used to characterize reflection and CD spectra of both single-layer reflective films and their corresponding sandwich structure. P is a linear polarizer, λ/4 is an achromatic quarter-wave plate, and BS is a beam splitter. (b) Optical characterization of a visible-range single reflective film and its corresponding sandwich structure. The reflection spectrum of a single reflective cotton-based CNC-organosilica film with linearly polarized (LP), right-handed circularly and right-handed elliptically polarized (RCP) electromagnetic radiation, and left-handed circularly and left-handed elliptically polarized electromagnetic radiation (LCP) incident electromagnetic radiation. (c) Corresponding reflection spectra of a visibly reflective sandwich structure. (d) Optical setup used to characterize transmission spectra of both single reflective films and their corresponding sandwich structure. (e) CD spectra of both the single film and the sandwich structure. (f) Transmission spectra with natural light (unpolarized electromagnetic radiation) incident on a single film and its analogous sandwich structure.

Figure 5:
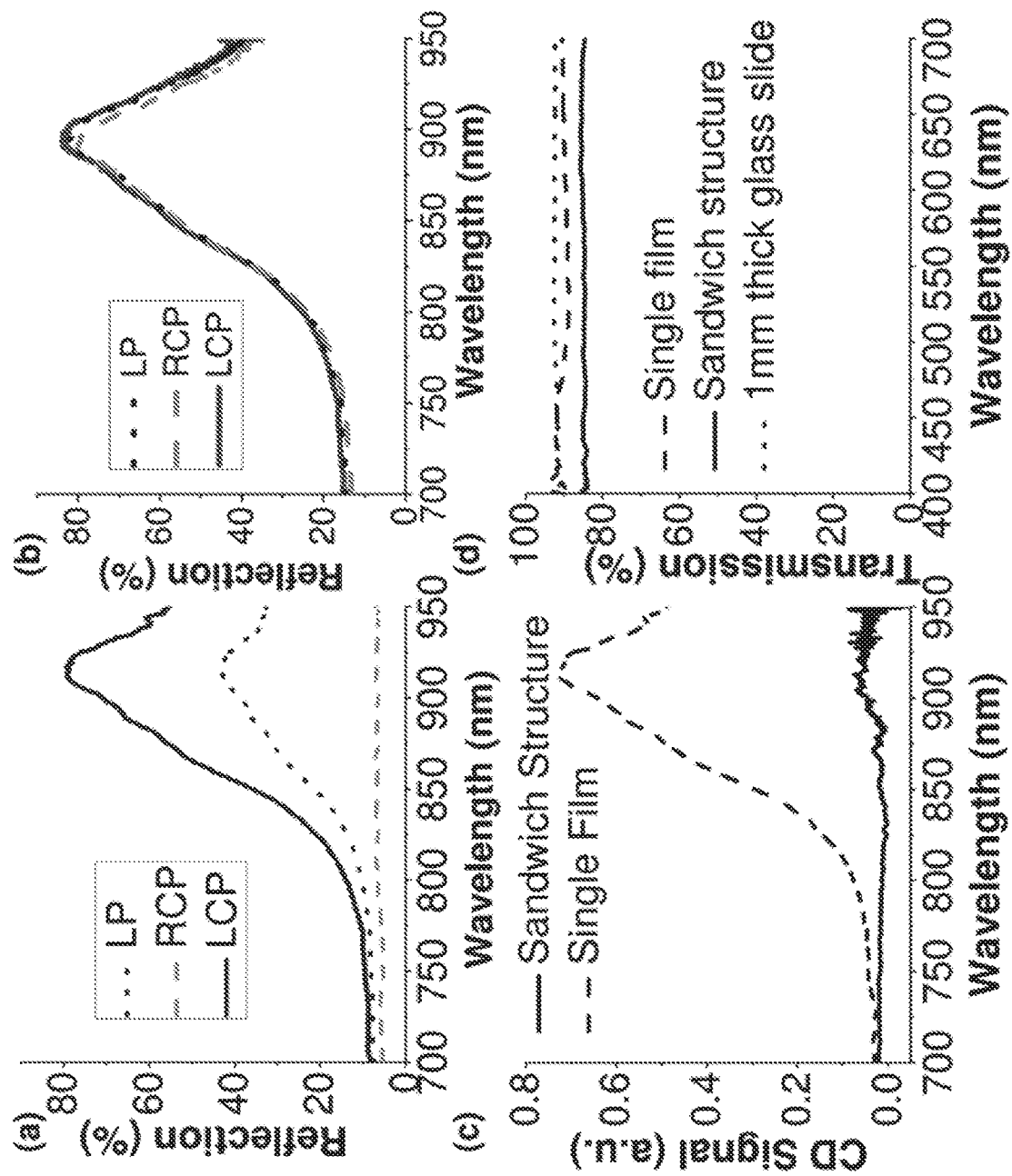

FIG. 5 illustrates optical characterization of a visibly transparent, single near-IR reflective film and its corresponding sandwich structure. (a) Reflection of a single reflective cotton Cellulose nanocrystals (CNC)-organosilica composite film with incident LP, RCP, and LCP radiation. (b) Corresponding reflection spectra of a spectrum sandwich structure (stack). (c) Circular dichroism (CD) spectra of both the single film and the sandwich structure. (d) transmission spectra with natural light (unpolarized electromagnetic radiation) incident upon a single film and its corresponding sandwich structure, showing average visible transmission of 90.1% for a single reflective film and 85.0% for the corresponding sandwich structure. The transmission of a 1 mm thick glass slide, averaging 92.3% visible transmission, is provided for comparison.

FIGS. 6-13 illustrate various structures in accordance with various embodiments of the disclosure.

It will be appreciated that the figures are not necessarily drawn to scale. For example, the dimensions of some of the elements in the figures may be exaggerated relative to other elements to help to improve understanding of illustrated embodiments of the present invention.

DETAILED DESCRIPTION OF EMBODIMENTS OF THE DISCLOSURE

The description of exemplary embodiments of the present disclosure provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

Various exemplary embodiments of the disclosure relate to materials, structures including the material(s) and to methods of forming and using the material(s). The materials and structures described herein allow for a bottom-up manufacturing process, which allows for relatively inexpensive methods to form the desired materials and structures.

The structures and materials described herein can be used for a variety of applications, including, for example, low-emissivity and solar-gain-regulating films, color and transparent visible-infrared filters, smart fabrics, optically enabled document security features, optical isolators, and other applications where shielding radiative heat while preserving visible-range transparency is desired. Furthermore, the use of inexpensive, abundant biomaterials such as cellulose and the implementation of a bottom-up fabrication approach make these materials a feasible, cost-effective solution that can be readily implemented.

As set forth in more detail below, exemplary embodiments of the disclosure provide cholesteric reflective material templated by one or more of biological material and biologically-derived material. The cholesteric reflective material can include periodic liquid crystalline helicoidal arrangements composed of (e.g., cellulose) nanomaterials. As used herein, the term nanomaterial or nanomaterials can refer to, for example, cellulose nanowhiskers, nanocrystalline cellulose (NCC), cellulose nanocrystals (CNCs), nanorods, chitin nanomaterials (e.g. chitin nanocrystals), chitosan nanomaterials (e.g. chitosan nanocrystals), and the like. Cellulose nanomaterials can refer to nanomaterials comprising or consisting of cellulose or cellulose-derived material.

In accordance with examples of the disclosure, a material can function as a Bragg reflection grating whose center reflection wavelength and reflection bandwidth depend upon the length along the helicoidal axis between consecutive helicoidal twisting periods. In one embodiment, a length between consecutive helicoidal periods remains constant for a narrow band reflector in the vicinity of the center reflection wavelength. In another embodiment, the length between consecutive helicoidal periods changes as one follows the helicoidal axis through the thickness of the cholesteric film material for the application of broad band reflector. As set forth below, a spacing between consecutive helicoidal twisting periods separated by a 2π rotation, called the pitch, is tunable, and thus the resulting reflected wavelength is also tunable from the visible to the near-IR regimes. The visible spectrum can be defined to be optical wavelengths between about 400 and about 700 nm. The near-IR spectrum can be defined to be radiation wavelengths between about 700 nm and about 2.5 µm.

Figure 1A:
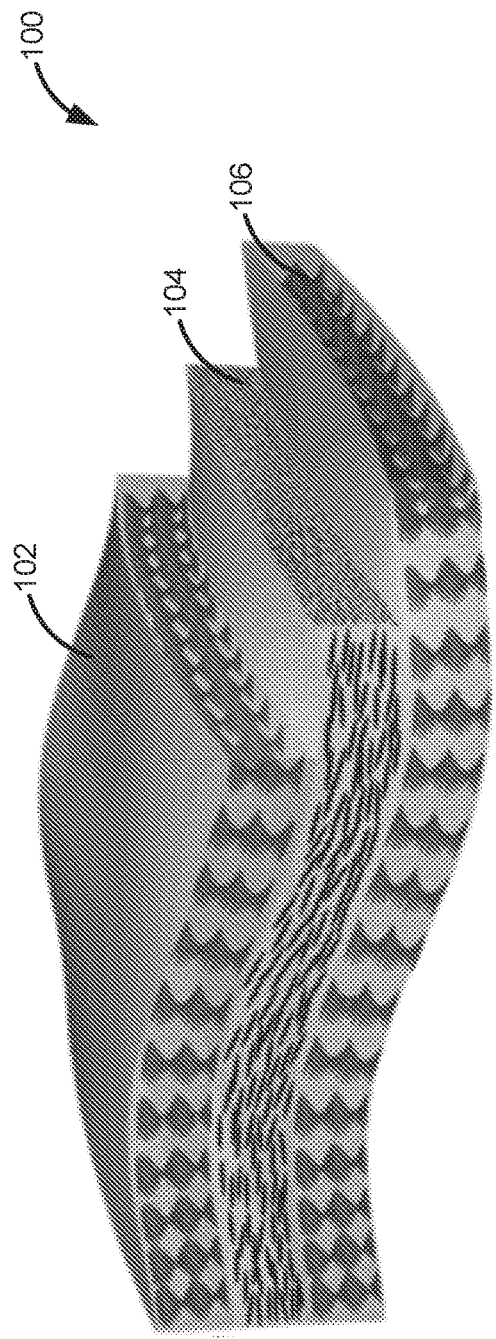
FIG. 1 illustrates a structure in accordance with exemplary embodiments of the disclosure.
Figure 1B:
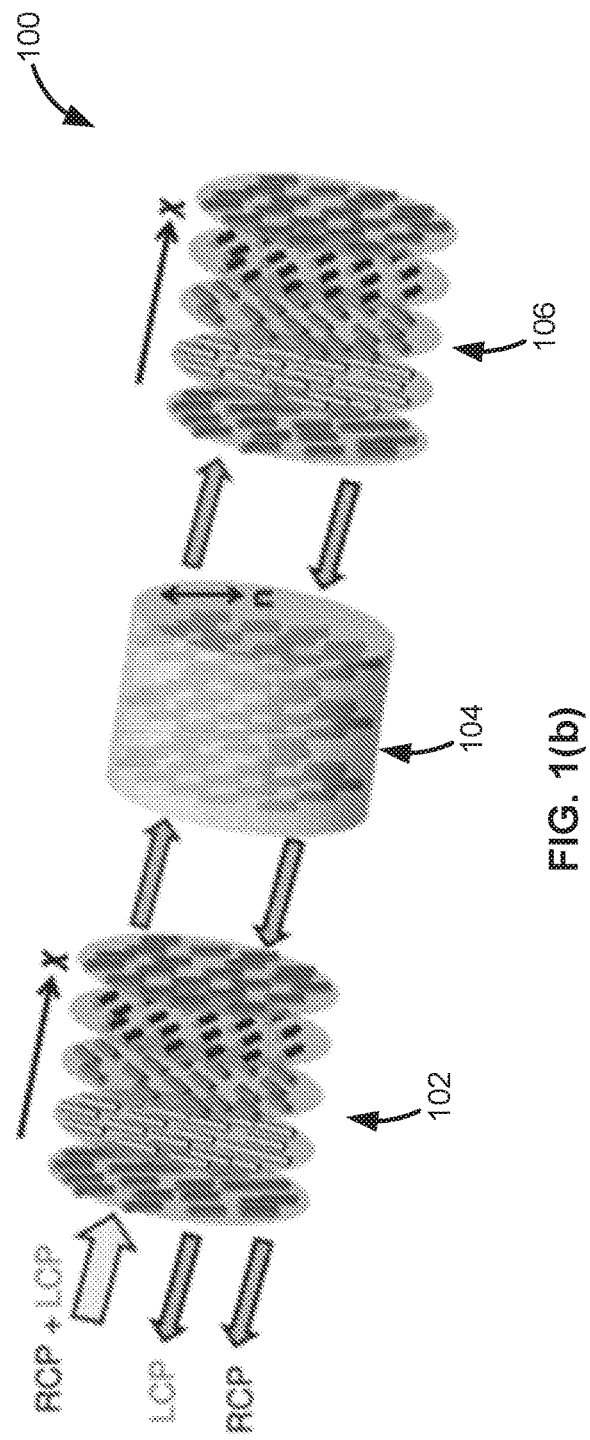

Turning now to the figures, FIG. 1 illustrates a structure 100 in accordance with exemplary embodiments of the disclosure, wherein (a) illustrates a cut-away view of structure 100 and (b) illustrates an exploded view of structure 100. Structure 100 includes a first material 102, a second material 104, and a third material 106. As set forth in more detail below, and as illustrated in FIGS. 6-13, structures in accordance with the disclosure can include multiple configurations, wherein the structures include at least one of first material 102 and second material 104.

In accordance with exemplary embodiments of the disclosure, material 102 and/or material 106 is or includes a cholesteric reflective material templated by one or more of biological material and biologically-derived material. Material 106 can be the same or similar to material 102. As illustrated, the cholesteric reflective material can have a chiral nematic structure. As used herein, chiral nematic material includes material that adopts a chiral helical structure resembling the liquid crystalline chiral nematic structure.

The cholesteric reflective material can include or consist of the one or more of biological material and biologically-derived material. For example, the cholesteric reflective material can include or consist of cellulose nanomaterial, chitin nanomaterial (e.g., chitin nanocrystals) and chitosan nanomaterials (e.g. chitosan nanocrystals). The cellulose nanomaterial can include sulfonated cellulose material. The cellulose can be derived from, for example, animals, such as tunicates, microorganisms, such as bacteria (e.g., one or more of *Acetobacter* hansenil, *Acetobacter xylinum*) and/or plants, such as cotton.

The cholesteric reflective material can be or include one or more of silica, organo-silica material, titanium oxide, and one or more polymers. Exemplary polymers include polycondensates of formaldehyde and urea, polycondensate of formaldehyde and melamine, polycondensate of formaldehyde and phenol, poly(ethylene glycol), and chain-wise polymers such as poly(ethylene glycol) diacrylate, poly (acrylic amide), and the like. When the cholesteric reflective material includes such materials, the materials can be templated by the one or more of biological material and biologically-derived material, and the one or more of biological material and biologically-derived material can be removed by dissolution or etching—e.g., using techniques described below.

As illustrated in FIG. 1, material 102 can circularly and/or elliptically polarize (e.g., right-handed) visible and near-infrared electromagnetic radiation. Additionally or alternatively, material 102 can reflect electromagnetic radiation, often polarizing this reflected radiation in the process.

Material 102 can include one or more additives to modify material properties. Such additives can include softeners or the like, such as plasticizers, such as glucose, fructose, pullulan or other small carbohydrates or small polymeric or oligomeric compounds such as polyethylene glycol and their derivatives, or stiffeners or the likes, such as embedded (e.g., nano) inclusions to enhance mechanical stiffness, such as titanium oxide ($TiO_2$).

One advantage of material 102 is that can reflect electromagnetic radiations and the wavelength of electromagnetic radiation reflected by material 102 can be determined by concentrations of compounds in the composition of the cholesteric reflective material, without changing the compounds—e.g., without changing the chemical makeup of the material or compounds.

Tunable reflection within the visible and near-IR regimes with material 102 can be achieved by controlling synthetic and processing conditions. For example, in the case of cellulose-templated material, sulfuric acid-catalyzed hydrolysis of cellulose preferentially etches amorphous cellulose domains, yielding colloidal chiral nanocellulose (e.g., nanocrystalline spindle-shaped rods). Different cellulose sources can vary in their degree of crystallinity and/or size of crystallites, and thus the size and yield of the nanomaterial obtained can depend on their source. Colloidal stability of the template material can result from Coulombic repulsion between the negatively charged sulfate ester moieties of the sulfonated material (e.g., sulfonated nanomaterial). Concentrating above the nanomaterial's critical Onsager concentration (about 3.5 wt % for bacterial nanomaterial and 5.0 wt % for cotton nanomaterial, depending on synthetic conditions and processing) results in a thermodynamically stable lyotropic cholesteric liquid crystal (LC). The nanomaterials inherit geometric chirality leads to adoption of the left-handed chiral nematic (cholesteric) LC phase with a helical axis denoted by X (FIG. 1(b)). The cholesteric phase's twisting repeated optical planes of spindle-shaped nanomaterial (e.g., rods) impart selective reflection of same-handed polarized radiation satisfying the diffraction condition $$\lambda = \bar{n}p \cos \theta$$

where $\lambda$ is the wavelength of reflected radiation, n is the average refractive index of the cholesteric medium (taken to be 1.5 for the nanocellulose-organosilica system), p is the pitch of the medium, defined as the distance between two LC building blocks separated by a $2\pi$ rotation, and $\theta$ is the angle of incidence with respect to the helical axis X (normal to the plane of the material in this case). In one example, cotton nanocellulose material is used in material 102 and material 106 due to its smaller size and thus smaller pitch compared to bacterial-based nanocellulose, blue-shifting their reflection into the visible and near-IR domains. The diffraction condition dictates reflection centered about a wavelength $\lambda_0 = \bar{n}p$ with a full width at half-maximum $\Delta\lambda = \Delta n(p)$, with birefringence $\Delta n = (n_e - n_o)$, where $n_e$, $n_o$ are the extraordinary and ordinary refractive indices of the birefringent medium, respectively. Colloidal nanomaterials can preserve the cholesteric assembly upon evaporation in a process known as evaporation induced self-assembly (EISA), forming free-standing (e.g., left-handed) helicoidal dry materials. Post-EISA the materials undergo an according pitch shrinkage, blue-shifting the reflection peak of a dried material compared to its solvent (e.g., aqueous) counterpart. Berreman 4×4 matrix simulation results show reflectivity saturates at a material thickness of ~10p, suggesting 10-15 μm thick reflective materials.

Peak reflection of exemplary material 102, 106 can be tuned by, for example, increasing organosilica loading—e.g., from 5 wt % to 35 wt % to increase its colloidal pitch, red-shifting its reflection wavelength from 400 nm to 915 nm. Freestanding nanomaterial-organosilica materials prepared with 21.3 wt % (Table 1) organosilica loading exhibit 45% peak reflection

TABLE 1

| | reflective color | | | |
|---|---|---|---|---|
| component | blue | green | red | near-IR |
| cotton CNC (wt %) | 48.7 | 46.0 | 43.9 | 37.4 |
| organosilica (wt %) | 21.3 | 24.0 | 26.1 | 32.6 |
| PEG-400 (wt %) | 30.0 | 30.0 | 30.0 | 30.0 | of 400 nm electromagnetic radiation and appear blue in reflection, while further increasing their loading to 24.0 wt % (Table 1) resulted in a 41.7% reflection of 557 nm electromagnetic radiation with a full width at half maximum of 119 nm, appearing green in reflection. Further organosilica loading to 26.1 wt % (Table 1) formed a red reflective material reflecting 39.5% of 688 nm electromagnetic radiation with a full width at half-maximum of 122 nm, while loading near the maximum capable of sustaining the cholesteric phase results in a near-IR reflection with a peak reflection of 40.4% at 915 nm. The exemplary material reflects ~8% of background radiation due to the refractive index contrast of about 0.5 at both optical interfaces of the material. The near-IR reflective material featured about 92% transparency averaged across the visible spectrum and excellent flexibility due to the addition of an additive (e.g., plasticizer PEG-400).

Figure 2:
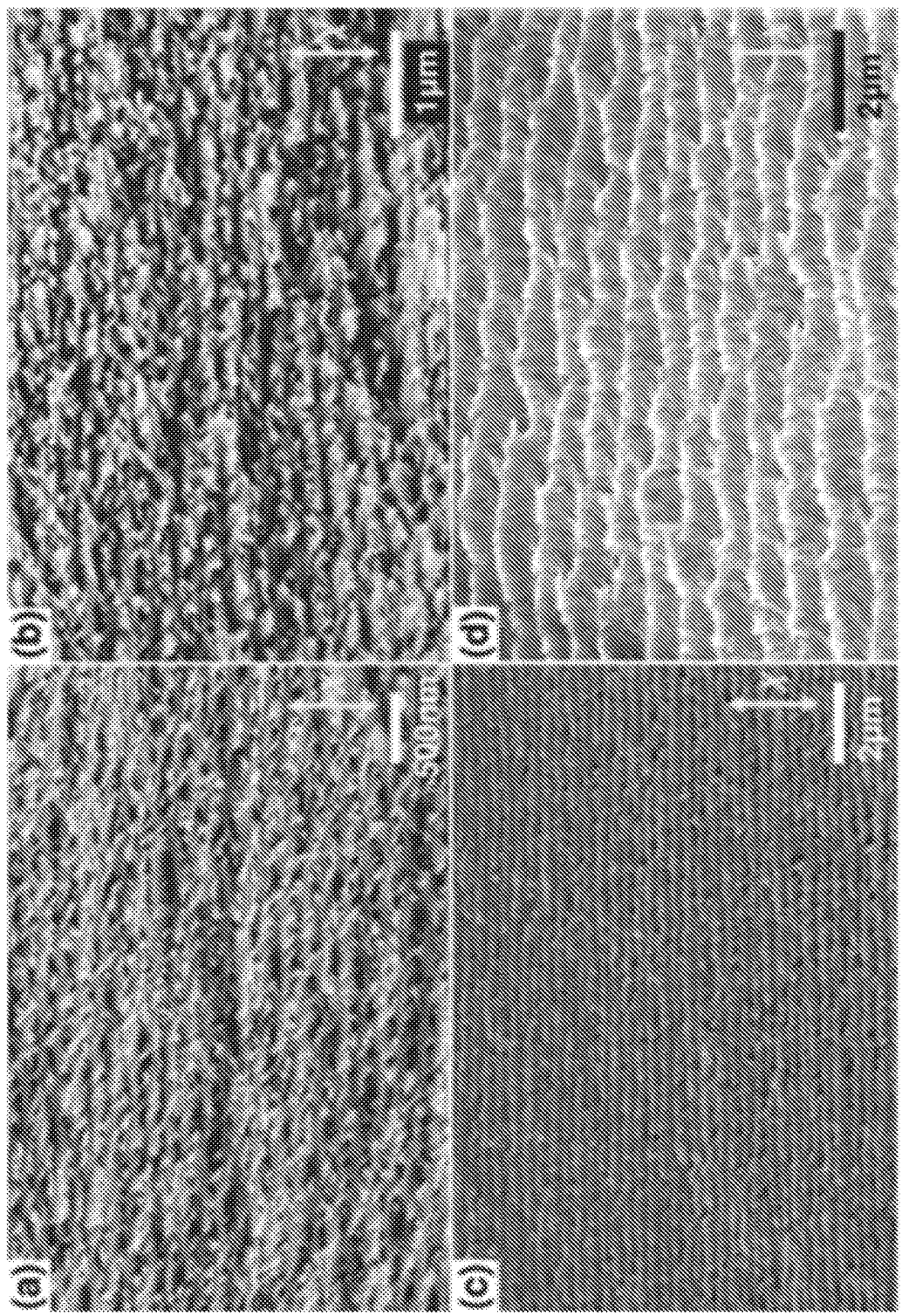
FIG. 2 illustrates cross-sectional scanning electron micrographs of dried Cellulose nanocrystals (CNC)-based cholesteric-like films confirm effectiveness of static 2000 G magnetic field alignment in promoting macroscopic single-domain configurations. The pitch, and thus the corresponding reflection peak, is tunable from p=(a) 286 nm to (b) 357 nm to (c) 660 nm to (d) 1.3 µm.

Scanning electron microscopy photographs of material 102 with magnetic field aligned single-domain organization are shown in FIG. 2. Maximum reflectivity of a single cholesteric-like nanomaterial per unit material thickness can be attained by alignment of nanomaterials via subjection to an external static magnetic field during evaporation. Nanomaterials can be a negative magnetic susceptibility anisotropic material, and an external magnetic field of magnitude ≥2000 G directed normal to the nanomaterial's surface can overcome room-temperature thermal fluctuations, aligning the cholesteric LC with its helical axis x parallel to the field, with the nanomaterial director orthogonal to the field. Cross-sectional transmission electron micrographs confirm the static magnetic field successfully aligns the cholesteric-like domains of nanocellulose organosilica composite structures, with domains with pitch as small as 286 nm (FIG. 2($a$)) being well aligned, corresponding to blue reflective materials. This alignment technique is valid for materials reflecting across the visible and near-IR regimes, as macroscopic-sized single crystalline cholesteric-like domains corresponding to green reflective materials (p=357 nm, FIG. 2($b$)), near-IR reflective films (p=660 nm, FIG. 2($c$)), and films with even larger pitch (p=1.3 μm, FIG. 2($d$)) are realized.

Material 104 can include any suitable retarder material. In accordance with exemplary embodiments of the disclosure, the retarder material can be templated by one or more of biological material and biologically-derived material, such that the retarder material can include a non-chiral nematic structure. Similar to material 102 and material 106, material 104 can include or consist of the one or more of biological material and biologically-derived material. Or, material can be templated by the one or more of biological material and biologically-derived material and include or consist of other material, such as or more of silica, organo-silica material, titanium oxide, and one or more polymers. Exemplary polymers include polycondensate of formaldehyde and urea, polycondensate of formaldehyde and melamine, polycondensate of formaldehyde and phenol, polyethylene glycol, chain-wise polymers such as poly(ethylene glycol) diacrylate, poly(acrylic amide), and the like. Similar to above, when retarder material includes such materials, the materials can be templated by the one or more of biological material and biologically-derived material, and the one or more of biological material and biologically-derived material can be removed by dissolution or etching—e.g., using techniques described below. In other cases, the retarder material can be or include commercially-available retarder material.

The one or more of biological material and biologically-derived material can be the same or similar to the one or more of biological material and biologically-derived material described above. Both the optical retarder and the cholesteric reflective material can made from nanomaterials comprising a range of sizes (e.g., having a length of between about 500 nm and about 5 or a length between about 800 nm and about 3 μm μm plus/minus two sigma and a width between about 40 nm and about 60 nm or a width between about 45 nm and about 55 nm plus/minus two sigma) or a combination of longer and shorter (or various sizes) nanomaterials, (e.g., a length of between about 100 nm and about 400 nm or a length between about 150 nm and about 250 nm plus/minus two sigma and a width between about 5 nm and about 15 nm or a width between about 8 nm and about 12 nm plus/minus two sigma) or can be made from larger nanomaterials.

In accordance with examples of the disclosure, material 104 includes a plurality of layers, wherein each layer comprises aligned nanomaterial. A total thickness of material 104 can range from about 100 nm to about 100 μm or from about 150 nm to about 20 μm. Use of multiple layers allows adjustable by integer multiples of retardation of a material 104. Each layer can include aligned nanomaterial (e.g., nanorods or the like). Further, to allow additional tuning of material 104, one or more layers of material 104 can include aligned nanomaterial sourced from a plurality of sources—e.g., bacterial derived and/or animal derived and/or plant derived material.

Exemplary retarder material can be made by a series of successive linear shear deposition cycles and subsequent solvent evacuation. Shearing colloidal nanomaterial aligns the nanomaterial with their net direction (the liquid crystalline director) aligned along the shear direction; this arrangement can then be locked into place by rapid evaporation (e.g., with the aid of applied heat) of the colloid's solvent. These materials introduce incident radiation to a retardation L related to net birefringence Δn and optical path length d given by L=Δn(d). The deposition of successive layers can discretely tune the retardation of the birefringent material (material 104) by integer multiples of the retardation of a single layer.

This layer-by-layer manufacturing approach allows for preparation of optical retarders spanning the visible and near-IR ranges of wavelengths. Unidirectionally aligned, nematic-like organization of nanomaterial (e.g., pure bacterial and cotton nanomaterial) is confirmed by polarized optical and scanning electron microscopies, respectively. Minimal transmitted intensity between crossed polarizers is observed when the shearing direction is parallel to either polarizer (FIG. 3($a$)). Transmission between crossed polarizers is maximized when the nanomaterial director is oriented 45° with respect to either polarizer, confirming the presence of unidirectionally aligned nanomaterial, with their long axes oriented along the shear direction (FIG. 3($b$)).

The aligned nanomaterial features positive birefringence, as evidenced by insertion of a 530 nm retardation plate when the director is oriented +45° with respect to the polarizer, causing the overall system to appear bluish (FIG. 3($c$) illustrated in black and white). Scanning electron microscopy of the shear plane confirms both bacterial nanomaterial (FIG. 3($d$)) and cotton nanomaterial (FIG. 3($e$)) eachadopt the aligned nematic-like configuration with its director oriented along the shear direction. Nematic-like bacterial nanomaterial based wave plates with net birefringence of about Δn=0.0226 and retardation spanning from 48 to 838 nm (FIG. 3($f$)) are formed, and the average retardation per bacterial nanomaterial layer deposited is found to be 54 nm. Bacterial nanomaterials are larger and retard radiation more than cotton nanomaterials, enabling coarse and fine adjustments of the wave plate's retardation. An average wavelength retardation Δn(d) per unit material thickness d for bacterial nanomaterial is found to be 22.6 nm of retardation per micrometer of material thickness, compared to cotton nanomaterial at 6 nm of retardation per micrometer of material thickness.

A single- (e.g., left-) handed cholesteric-like material can have a theoretical 50% maximum reflection limit due to selective reflection. However, with a structure, such as structure 100, this limitation is overcome with the inclusion of material 104. In the illustrated example, structure 100 includes two (e.g., left-handed) cholesteric-like composite material 102 and 106 and retarder material 104. Structure 100 can possess a polarization-independent reflection of incident radiation satisfying the Bragg diffraction condition. This three-layered structure can achieve total or near total reflection from solely same-handed (e.g., solely left-handed) material.

By way of particular examples, polarization-independent reflection of structure 100 can result from the combination of cholesteric- and nematic-like optical elements, enabling reflection of nearly all incident electromagnetic radiation, be it natural light (i.e., unpolarized electromagnetic radiation) or some combination of linearly and/or circularly and/or elliptically polarized electromagnetic radiation satisfying the Bragg reflection condition presented earlier, electromagnetic radiation solely by single-handed (e.g., left-handed) cholesteric-like materials. When natural light (unpolarized electromagnetic radiation) is incident upon structure 100 and assuming a left-handed chiral version of structure 100, the LCP component of electromagnetic radiation corresponding to the Bragg diffraction condition can be selectively reflected. For example, any RCP component of incident electromagnetic radiation is transmitted through material 102, and is then converted into LCP electromagnetic radiation by the retarder material 104 acting as a half-wave plate. This LCP electromagnetic radiation is reflected by the material 106 and is converted back into RCP electromagnetic radiation as it transmits through retarder material 104 again. Finally, this RCP electromagnetic radiation is transmitted through material 102. Thus, all polarizations of electromagnetic radiation are reflected, as depicted in the scheme in FIG. 1(b). The reflective performance of the structure is polarization-independent and shows 2-fold reflection enhancement as compared to a single cholesteric-like material. Because the pitch of the material 102, 106 and the retardation of the nematic-like material are tunable from the visible to near-IR regimes, it follows that this reflection enhancement is also tunable in those same regimes.

In an additional embodiment of the invention, a multiplicity of repeated nematically aligned films and cholesteric reflective films can be stacked to improve reflection bandwidth and/or reflection intensity. In other words, a stack can include at least two layers comprising the reflective material 102/106 and at least one layer comprising the retarder material and a structure can include one or more stacks. Also, as noted above, a non-nematically ordered, e.g., commercially available optical retarder can be used in place of one or more of the nematic-ordered optical retarder.

Sandwiching material 104 between material 102 and material 106 can increase reflectivity by as much as 95% compared to a material 102 or 106, due material 104 polarizations of incident radiation satisfying the Bragg diffraction condition. Reflection and CD spectra of material 102/106 and their corresponding sandwich structure are recorded following the schematic detailed in FIG. 4(a). Spectroscopic data revealing reflection performance of linearly polarized (LP) radiation show a single cholesteric-like organosilica nanocomposite material reflected only 41.6% of peak radiation (occurring at a wavelength of 558.3 nm), reaching 83.2% of its 50% reflection limit originating from selective reflection due to its left-handed chiral structure (FIG. 4(b)). When LCP electromagnetic radiation is incident upon the visibly reflective left-handed single material, a 63% increase of peak reflected radiation compared to incident LP electromagnetic radiation, as 67.8% reflection of incident 567.0 nm electromagnetic radiation, is observed (FIG. 4(b)). This case contrasts the case when RCP radiation is incident upon the left-handed single material, in which case no reflection peak is detected (FIG. 4(b)). A ~10% background reflected intensity exists when RCP radiation is incident, due to the refractive index contrast of about 0.5 at both of the material's optical interfaces with air; when this 10% background reflection is subtracted from the LP and LCP curves, an 83% increase in reflected intensity was calculated for incident LCP radiation compared to incident LP radiation. This near doubling of the effective reflection is explained by the nature of LP radiation, which can be thought of as a superposition of in-phase LCP and RCP components. The polarization-dependent reflection of a single left-handed cholesteric-like material contrasts with the reflection of the sandwich structure, where polarization-independent reflection is achieved. A peak reflected intensity of 73.9% of incident LP radiation at 537.4 nm by the sandwich structure is recorded (FIG. 4(c)), corresponding to a 77.64% increase in LP reflection performance compared to a single reflective material. The LP reflective performance of the sandwich structure is similar to its performance when LCP radiation is incident, where a peak reflected intensity of 73.9% of 542.5 nm radiation is captured (FIG. 4(c)). When combined with the RCP reflective performance of the sandwich structure, with a peak reflection of 72.2% at 534.0 nm (FIG. 4(c)), the sandwich structure reflects all polarizations of electromagnetic radiation equally, within experimental error. The 9 nm range of peak reflection of the single-layer material and sandwich structure arises from microstructural defects present within the sample. The reflective CD spectrum of each structure reinforces the contrast seen in the polarization-dependent nature of a single cholesteric-like material compared to the sandwich structure (FIG. 4(d)), as the polarization-dependent single material shows a non-trivial positive CD signal of 60.2% at 567 nm, indicating LCP radiation interacts much more strongly with a single left-handed material than RCP radiation.

The CD signal of the sandwich structure confirms its polarization-independent interaction with electromagnetic radiation, as a very different CD response is obtained (FIG. 4(e)). The CD signal of the sandwich structure has a small peak of 11.0% at 567 nm (5.5 times decreased compared to a single material) and is caused by the 9 nm difference in LCP and RCP reflection peaks. Transmission spectra of single materials and their corresponding sandwich structure are characterized by using an optical setup schematically shown in FIG. 4(d).

The corresponding transmission spectra of the single material and sandwich structure show similar transmission of natural light (unpolarized electromagnetic radiation) not satisfying the Bragg condition for both structures, except for the reflection trough at 567 nm (FIG. 4(f)), which is found to be 66% lower for the sandwich structure compared to its single material counterpart.

The polarization-dependent interaction of electromagnetic radiation in a single visibly reflective film and the polarization-independent interaction of electromagnetic radiation of its corresponding visibly reflective sandwich structure were confirmed and visualized via reflective optical microscopy. A single reflective film was observed to moderately reflect green LCP electromagnetic radiation, while only marginally reflecting incident green LP electromagnetic radiation. When RCP radiation is incident upon a single reflective film, about 10% of all electromagnetic radiation across the visible spectrum was reflected, and so the corresponding micrograph was dark gray. The sandwich structure reflects electromagnetic radiation with all polarizations of incident radiation equally.

Visibly transparent, near-IR reflective nanomaterial-organosilica photonic structures were prepared by increasing organosilica loading to red-shift both helicoidal optical components' reflection. The polarization-dependent nature of a single material compared to the polarization-independent reflection of its corresponding sandwich structure emulates observations of the visibly reflective photonic nanomaterial (e.g., crystal structures). Their reflection, CD, and transmission spectra are obtained using the optical setup detailed in FIGS. 4(a) and (d), respectively. A single reflective film has peak LP reflectivity 40.4% at 915.4 nm FIG. 5(a) and comparatively shows a 97.0% increase in reflectivity when LCP radiation is incident, reaching 79.6% reflection at 915.4 nm (FIG. 5(a)). When RCP radiation is incident upon a single reflective film, no reflection peak is observed and an average background reflectivity of 6.4% is captured FIG. 5(a) due to reflection caused by the refractive index contrast at each of the film's optical interfaces with air. The IR-reflective sandwich structure's reflection is polarization independent, as a peak reflectivity of 83.6% at 895.6 nm is seen when LCP radiation is incident, comparable to peak reflectivity of 81.9% at the same wavelength when LP radiation is incident and peak reflectivity of 80.3% at 893.3 nm when RCP radiation is incident (FIG. 5(b)). The CD signal of the sandwich structure (stack) confirms its polarization-independent interaction with electromagnetic radiation, as a weak CD signal is obtained, averaging 2.1% (FIG. 5(c)). A single reflective film's CD spectrum shows a positive signal peaking at 72.5% at 915.4 nm, revealing its highly polarization-dependent interaction with incident radiation (FIG. 5(c)). Visible transmission of the IR-reflective single film and sandwich structure yields comparable results, with a single film transmitting an average of 90.1% of incident visible radiation and the sandwich structure transmitting an average of 85.0% of visible radiation FIG. 5(d). The 5.1% difference between these two curves arises from the doubled number of optical interfaces of the sandwich structure compared to a single reflective film. Visibly transparent IR reflectors are of particular interest in applications such as solar gain regulators, radiative heat filters, microscopy optical elements, and other applications where optical observations need to take place alongside thermal shielding.

Figure 6:
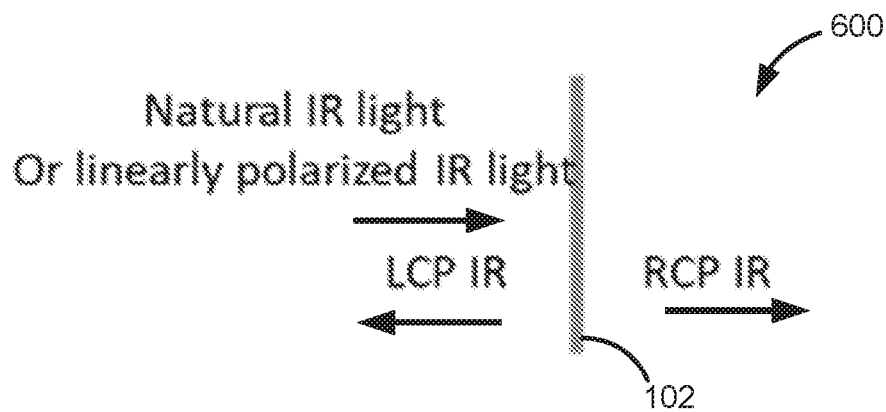
Figure 7:
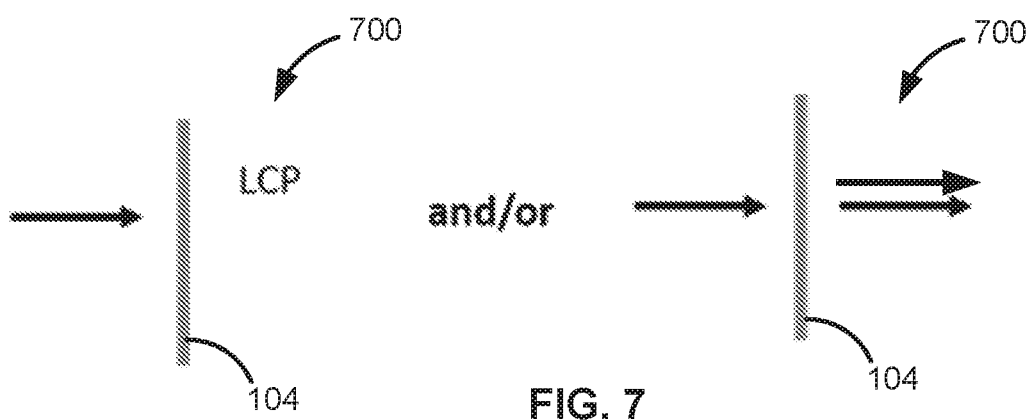
Figure 8:
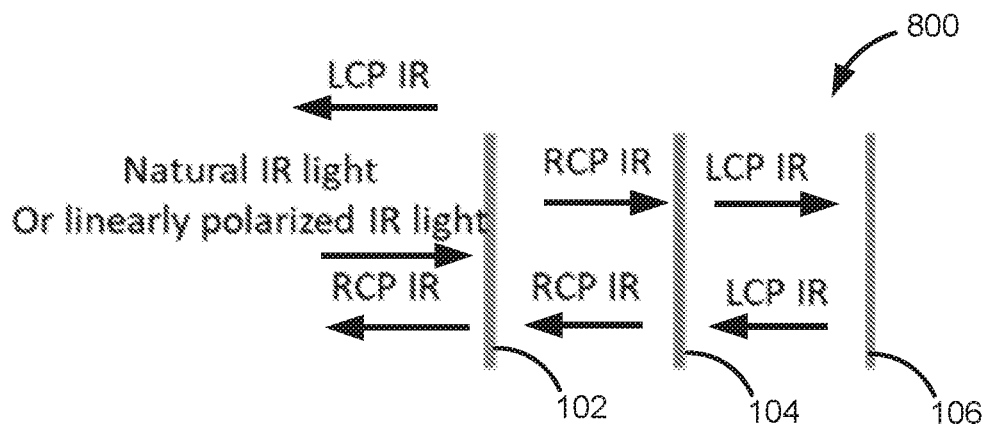
Figure 9A:
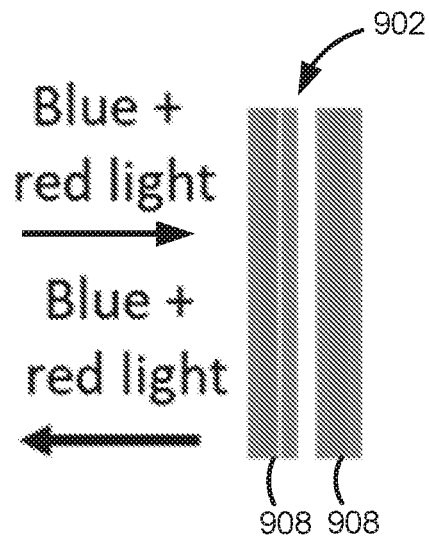
Figure 9B:
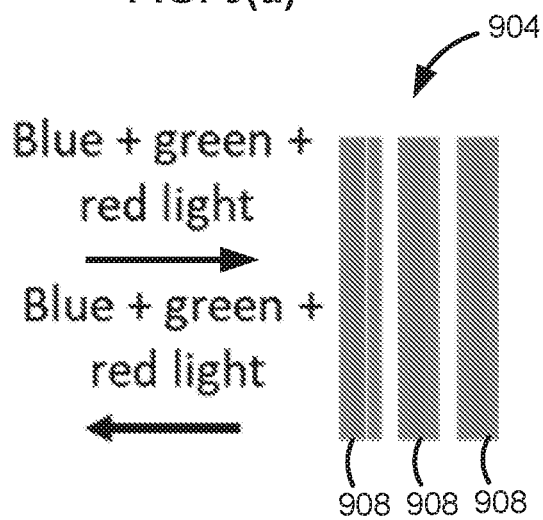
Figure 9C:
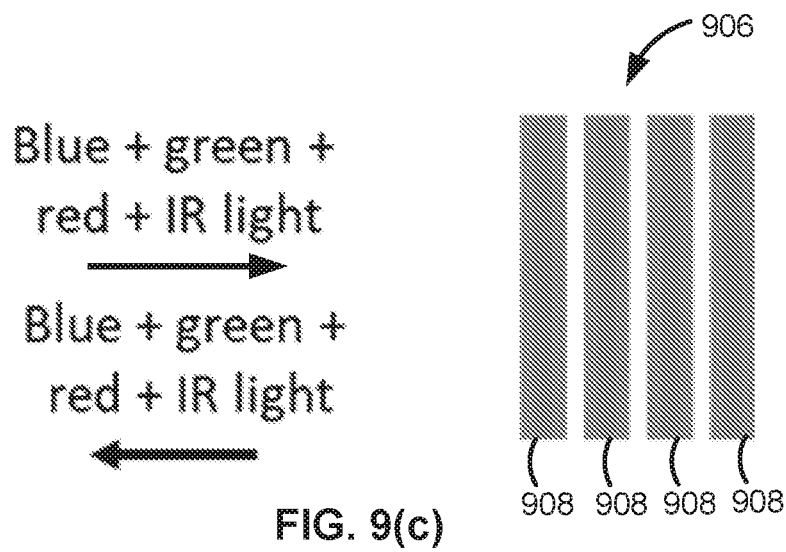
Figure 10:
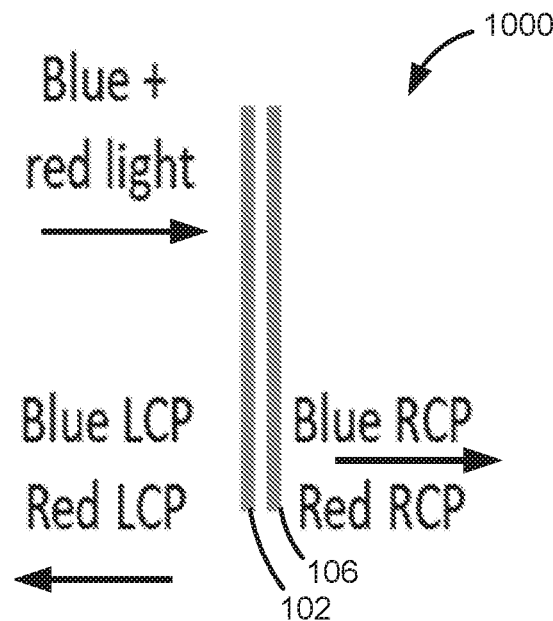
Figure 11:
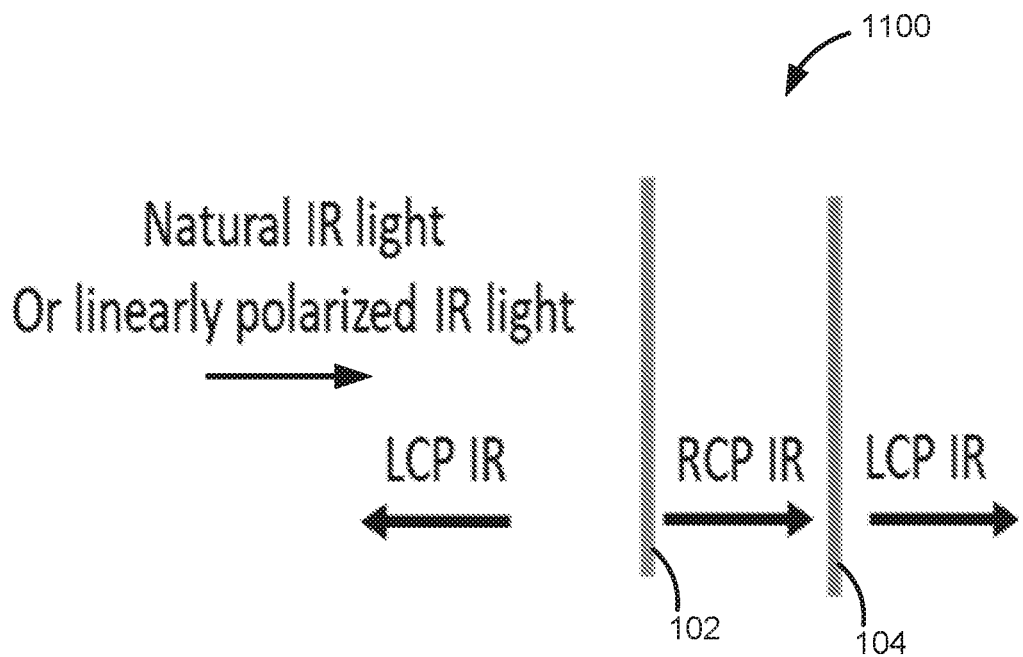
Figure 12:
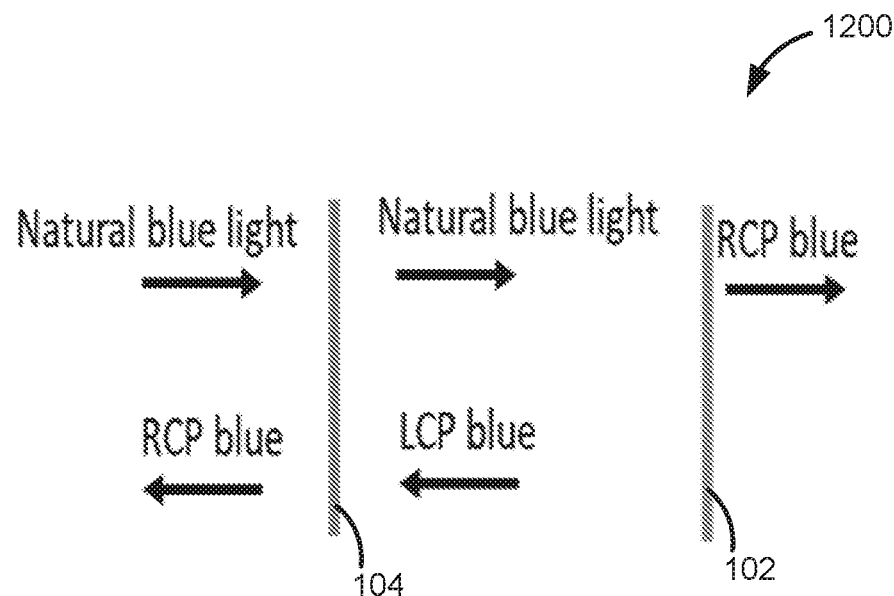
Figure 13:
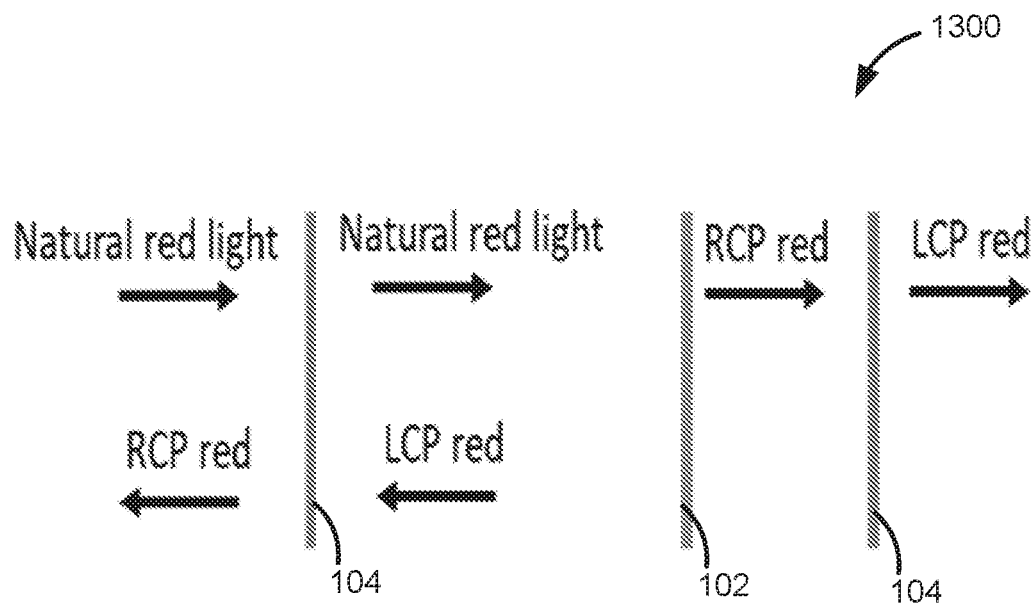

FIGS. 6-13 illustrate exemplary configurations of structures in accordance with the disclosure. FIG. 6 illustrates a structure 600 including a single cholesteric reflective material 102. For the sake of illustration, in all of the following examples in this paragraph, the cholesteric material is left-handed; however, this is not necessarily the case. The cholesteric reflective material could alternatively each be right handed or could be a combination of right handed and left handed material. Material 102 can reflect LCP, transmit RCP, and acts as an RCP polarizer and an LCP mirror. FIG. 7 illustrates a structure 700 that includes a single optical retarder material 104, which changes handedness of electromagnetic radiation, RCP to LCP or LCP to RCP. FIG. 8 illustrates a stack structure 800 (which can be the same or similar to structure 100) that can reflect both LCP and RCP, and that achieves total reflection of targeted wavelength/color). FIG. 9 illustrates structures 902, 904, and 906 including, multiple stacks 908, which can provide broadband total reflection. Each stack 908 includes two cholesteric reflective materials and a retarder material as described herein. FIG. 10 illustrates a structure 1000 including multiple cholesteric reflective films, no optical retarder. In the case where one cholesteric reflective material is right handed and the other cholesteric reflective material is left handed, total reflection of targeted wavelengths can be achieved without use of retarder material. FIG. 11 illustrates a structure 1100 that includes 1x optical retarder material and 1x cholesteric reflective material, with electromagnetic radiation incident on cholesteric film first. Structure 1100 can convert natural (unpolarized) or linearly polarized electromagnetic radiation into reflected LCP and transmitted LCP (half of incident electromagnetic radiation reflected as LCP, half transmitted as RCP and then immediately converted to LCP via the optical retarder). FIG. 12 illustrates a structure 1200 that includes 1x retarder material+1x cholesteric reflective material, with electromagnetic radiation incident on optical retarder film first, which converts incident electromagnetic radiation into reflected RCP and transmitted RCP (half of incident electromagnetic radiation reflected as LCP and then converted to RCP by the optical retarder, half transmitted as RCP). Finally, FIG. 13 illustrates a structure 1300 that includes an inverted sandwich structure, which acts opposite of single cholesteric film in that RCP electromagnetic radiation is reflected and LCP transmitted (acts as an LCP polarizer and RCP mirror). Other structures are also included within the scope of this disclosure.

Methods

The examples provided below illustrate methods of forming exemplary reflective material and retarding materials. These examples are illustrative only, and unless otherwise noted, are not meant to limit the scope of the claims.

Preparation of Single Reflective Films Capable of Reflecting 50% of Incident Target Radiation.

1) Preparation of Pure Cellulose Nanocrystal (CNC) Visibly and Near-IR Reflective Films.

Visibly and near-IR reflective films made solely from CNCs are prepared as follows: Aqueous CNCs are gently sonicated for 10 minutes in 5-15° C. water. Optionally, plasticizer agents or other additives can be added to the aqueous CNCs to enhance the final reflective solid film's mechanical properties, see plasticizer section below. The solution is deposited ('cast') on a substrate (e.g., a polystyrene Petri dish) and the water is allowed to natural evaporate ('cure') under ambient conditions or under various humidity and temperature conditions (from 0-100% relative humidity, from 5° C. to 40° C.) in the presence of a 2000 Gauss magnetic field oriented normal to the film surface, to align the cholesteric media's helical axis uniformly perpendicular to the film surface. After evaporation (1-14 days), a solid freestanding film is left, and this film preserves the cholesteric-like configuration that it had in the liquid crystal state (before evaporation) with an accompanying ~90% pitch shrinkage (where the pitch is defined as the distance between consecutive helicoidal twisting $2\pi$ periods).

2) Preparation of Composite CNC/Organosilica Visibly and Near-IR Reflective Materials.

Visibly and near-IR reflective composite films made from CNCs and organosilica are prepared as follows, using organosilica precursors such as 1,2-bis-(trimethoxysilyl)ethane (BTMSE) and possibly with addition of plasticizers (e.g. polyethylene glycol-based oligomers or carbohydrates, see plasticizer section below for more details) to aqueous CNCs prior to 1 hour of magnetic stirring at 600 rpm of the organosilica precursor with aqueous CNCs. The mixture is deposited ('cast') on a polystyrene Petri dish and the water is allowed to natural evaporate ('cured') under ambient conditions or under various humidity and temperature conditions (from 0-100% relative humidity, from 5° C. to 40° C.) in the presence of a 2000 Gauss magnetic field oriented normal to the film surface, to align the cholesteric media's helical axis uniformly perpendicular to the film surface.

After evaporation (1-14 days), a solid freestanding film is left, and this film preserves the cholesteric-like configuration that is had in the liquid crystal state (before evaporation) with an accompanying ~90% pitch shrinkage (where the pitch is defined as the distance between consecutive helicoidal twisting $2\pi$ periods). If desired, the cellulose can be etched away, leaving a cholesteric-ordered reflective organosilica film free of cellulose (see etching section below).

3) Preparation of Composite CNC/Silica Visibly and Near-IR Reflective Material.

Visibly and near-IR reflective composite films made from CNCs and silica are prepared as follows, using organosilica precursor Tetramethyl orthosilicate (TMOS) and possibly with addition of plasticizers (e.g. polyethylene glycol-based oligomers or carbohydrates, see plasticizer section below for more details) to aqueous CNCs prior to 1 hour of magnetic stirring at 600 rpm of the organosilica precursor with aqueous CNCs. The mixture is deposited ('cast') on a polystyrene Petri dish and the water is allowed to natural evaporate ('cured') under ambient conditions or under various humidity and temperature conditions (from 0-100% relative humidity, from 5° C. to 40° C.) in the presence of a 2000 Gauss magnetic field oriented normal to the film surface, to align the cholesteric media's helical axis uniformly perpendicular to the film surface. After evaporation (1-14 days), a solid freestanding film is left, and this film preserves the cholesteric-like configuration that is had in the liquid crystal state (before evaporation) with an accompanying ~90% pitch shrinkage (where the pitch is defined as the distance between consecutive helicoidal twisting $2\pi$ periods). If desired, the cellulose can be etched away, leaving a freestanding cholesteric-ordered reflective silica film free of cellulose (see etching section below).

4) Preparation of Composite CNC/Polymeric Visibly and Near-IR Reflective Materials.

Visibly and near-IR reflective composite films made from CNCs and non-cellulosic polymers are prepared as follows, using water soluble polymeric resins or oligomers with reactive end groups (e.g. partially polymerized oligomers of urea/formaldehyde condensation polymer, phenol/formaldehyde condensation polymer, melamine/formaldehyde condensation polymer, short polymeric chain oligomers of poly ethylene glycol with reactive acrylic or amine end groups, etc.) and possibly with addition of plasticizers (e.g. polyethylene glycol-based oligomers or carbohydrates, see plasticizer section below for more details). Optionally, radical initiators such as 2-Hydroxy-4-(2-hydroxyethoxy)-2-methylpropiophenone (commercially available as Irgacure 2959), potassium persulfate (KPS), Azobisisobutyronitrile (AIBN), ammonium persulfate (APS), benzoyl peroxide (BPA) or other peroxide based-radical initiators can be added to promote polymerization and crosslinking agents (e.g. melamine) can be added to increase the degree of the polymeric cross-linking (enhancing its mechanical properties). First, aqueous CNCs are gently sonicated for 10 minutes in 5-15° C. water. Then, liquid- or solid-state polymeric precursor(s) is (are) mixed in with the aqueous CNCs, and optionally the radical initiators and/or cross-linking agents listed above are also mixed in. This mixture is magnetically stirring at 600 rpm for one hour, and then this mixture is then deposited ('cast') on a polystyrene Petri dish and the water is allowed to natural evaporate ('cured') under ambient conditions or under various humidity and temperature conditions (from 0-100% relative humidity, from 5° C. to 40° C.) in the presence of a 2000 Gauss magnetic field oriented normal to the film surface, to align the cholesteric media's helical axis uniformly perpendicular to the film surface. After evaporation (1-14 days), either an entirely solid freestanding film (in the case that the polymeric precursor was solid) or a "wet" solid film with liquid polymeric precursors embedded in a cholesteric-like solid matrix remains. This material preserves the cholesteric-like configuration that is had in the liquid crystal state (before evaporation) with an accompanying ~90% pitch shrinkage (where the pitch is defined as the distance between consecutive helicoidal twisting $2\pi$ periods). However, for optimal mechanical properties and overall handleability (especially in the case of a wet solid film containing liquid polymeric precursors), it may be desirable that this material be further processed, to fully polymerize and cross-link the polymeric precursor. There are at least two polymerization schemes possible, as follows below.

i) UV-Cured Polymerization (Photopolymerization)

After the composite CNC/polymeric precursor film is obtained, the film is exposed to UV-radiation (365 nm) for 5-10 minutes, and afterwards a now polymerized, cross-linked composite reflective CNC/polymer film is obtained. PEG-based chemistries and poly(acrylamide)-based chemistries are well adapted to this method.

ii) Thermally Cured Polymerization

After the composite CNC/polymeric precursor film is obtained, the film is heated in an oven set at 30-100° C. for 1-24 hours, and afterwards a now polymerized, cross-linked composite reflective CNC/polymer film is obtained. The formaldehyde-based condensation polymer family (e.g. polycondensates of urea+formaldehyde, or melamine+formaldehyde, or phenol+formaldehyde or any combination of urea/melamine/phenol+formaldehyde) is/are particularly suited for this thermal polymerization scheme.

After polymerization, if desired, the cellulose can be etched away, leaving a cholesteric-ordered reflective polymeric film free of cellulose (see etching section below).

Removal of Cellulose from Composite Single Reflective Films (Optional)

1) Using Acid.

If desired, the cellulose can be etched away, leaving a cholesteric-ordered reflective organosilica film, by etching in 6 Molar sulfuric acid (H2SO) at 70-100° C. (typ. 70° C.) for 12-24 hours (typ. 18 hours) to obtain a cholesteric polyethylene reflective film. This cellulose etching is not suitable if the guest chemistry is also susceptible to chemical attack in acidic medium. As silica is acid-resistant, the cellulose from a composite cellulose/silica film can be effectively etched via acid while leaving the silica intact.

2) Using Base.

If desired, the cellulose can be etched away, leaving a cholesteric-ordered reflective organosilica film, by etching in 10 weight % sodium hydroxide or another strong base in water at 70-100° C. (typ. 93° C.) for 12-24 hours (typ. 18 hours) to obtain a cholesteric polyethylene reflective film. This cellulose etching is not suitable if the guest chemistry is also susceptible to chemical attack in basic medium.

3) Via Calcination

For composites featuring an inorganic guest chemistry (such as silica, but not organosilica), the cellulose can be burned away via calcination/burning. For calcination of a composite material, the material is inserted into an oven or furnace and heated to 100° C. via burning and is held there for an hour. After, the furnace is heated to 200° C. (also at 1° C./min) an held for one hour, then heated to 300° C. and held for an hour, then heated to 400° C. and held for an hour, and then finally heated to 550° C. and held for 8 hours. After this last 550° C. heating cycle, the furnace power is turned off and the furnace and film is naturally cooled back down to room temperature, yielding a cholesteric silica film free of cellulose or any other organic matter. Calcination is only appropriate for composite CNC/silica films, as organosilica and all polymers will burn off above 550° C.

Preparation of 3-Layered Films Capable of Reflecting 100% of Incident Target Radiation.

1) Using Two Reflective Material Layers or Films and a CNC-Based Nematic Phase Retarding Material.

The solid nematic-like bacterial or cotton CNC retardation plate is prepared by manual linear shear deposition of aqueous 3.5-5.0 wt % bacterial CNCs or 3.5-5.0 wt % cotton CNCs on a glass plate or directly on top of a cholesteric-like CNC film at a rate of 0.25 cm/s, followed by drying on a 30-35° C. hot plate. This process is repeated until the desired half wavelength retardation is achieved. When shear depositing on a glass plate, the nematic-like retarder film was removed from the glass plate by shearing with a cutting edge, leaving a freestanding film. All sandwich structures detailed herein were prepared by linear shear deposition of aqueous CNC directly on one cholesteric-like CNC-based film. To form the final sandwich structure from this two-layered film, another single cholesteric-like CNC-based reflective film is adhered to the two-layered film, with the nematic-like layer in the center, using a thin layer of adhesive (e.g. NOA 65, Norland Products, Inc.), followed by 1-5 min of 365 nm wavelength curing (OmniCure Series 2000). To achieve total reflection from this three layered structure, the retardation of the film is equal to half of the wavelength of the targeted reflected radiation, e.g. for a reflective film which reflects 800 nanometer radiation, an optical film must retard radiation by 400 nanometers.

2) Using Two Single Films and a Commercial Polymeric Phase Retarding Film.

Similar to the case above, a single reflective film is adhered to a commercially available optical retarder film via UV glue or other visibly transparent adhesive. Then another reflective film is adhered to the opposite side of the first reflective film, forming a three layered structure of reflective film/commercially available optical retarder/reflective film, with incident electromagnetic radiation hitting these 3 films in the order written.

Use of Optional Additives for Enhancement of Mechanical Properties, Potentially Redshifting Target Reflection.

Plasticizers, or small molecule additives, such as those described above, can be added to a mixture to increase material flexibility and/or mechanical toughness. The additives be added to either pure CNC films or to composite CNC/organosilica or CNC/polymeric films or the like. To do so, an amount of additive is added to a solvent (e.g., aqueous solvent) CNC or the solvent CNC/polymeric precursor liquid mixture prior to casting the liquid and evaporating the solvent equal to 5-35 weight % of the dry weight of cellulose. Plasticizers explored thus far include short chain polymeric oligomers such as polyethylene glycol (PEG), modified polyethylene glycols, or sugars and other carbohydrates such as glucose, fructose and pullulan. When short chain molecules such as PEG are used as a plasticizer, their degree of polymerization is between 10 and 600. It is worth noting that the plasticizer may or may not survive optional cellulose etching via acid, base or calcination, all depending on the plasticizer's interaction with acids, bases and high temperatures.

Use of relatively weak static magnetic fields to align CNCs perpendicularly to the film surface, enhancing reflection intensity, increasing reflected color uniformity and narrowing the reflection band.

After either the aqueous CNCs or the aqueous CNC/polymeric precursor mixture is cast and begins evaporation, it may be cured underneath a static magnetic field of at least field strength 2000 Gauss, with the magnetic field oriented normal to the cast liquid's surface.

Doing so enhanced the degree of CNC alignment, which results in an increased reflected intensity, a narrower band of reflected wavelengths and an overall increase in reflected wavelength (color, for visible light/visible electromagnetic radiation) uniformity. After the solution's solvent is completely evaporated and the solid reflective film is obtained, the magnet is no longer needed.

The present invention has been described above with reference to a number of exemplary embodiments and examples. It should be appreciated that the particular embodiments shown and described herein are illustrative of the preferred embodiments of the invention and its best mode, and are not intended to limit the scope of the invention. For example, although illustrative examples are described in connection with CNCs, unless otherwise noted, the disclosure is not so limited. It will be recognized that changes and modifications may be made to the embodiments described herein without departing from the scope of the present invention. These and other changes or modifications are intended to be included within the scope of the present invention.

We claim:

1. A cholesteric reflective material templated by one or more of biological material and biologically-derived material, wherein the cholesteric reflective material comprises a chiral nematic structure and one or more of titanium oxide or one or more polymers.

2. The cholesteric reflective material of claim 1, wherein the one or more polymers comprise poly(ethylene glycol), poly(ethylene glycol) diacrylate, poly(acrylic amide), polycondensates of formaldehyde and urea, polycondensates of formaldehyde and melamine, and polycondensates of formaldehyde and phenol.

3. The cholesteric reflective material of claim 1, wherein the biologically-derived material comprises one or more of cellulose nanomaterial, chitin nanocrystals and chitosan nanocrystals.

4. The cholesteric reflective material of claim 3, wherein the cellulose nanomaterial comprises sulfonated cellulose material.

5. The cholesteric reflective material of claim 1 that circularly and/or elliptically polarizes visible and near-infrared electromagnetic radiation.

6. The cholesteric reflective material of claim 1, further comprising one or more of glucose, fructose, pullulan, poly(ethylene glycol) and its derivatives, and embedded inclusions to modify film properties.

7. The cholesteric reflective material of claim 1, which reflects incident circularly and/or elliptically polarized components of visible and near-infrared electromagnetic radiation.

8. The cholesteric reflective material of claim 1, wherein wavelengths of electromagnetic radiation reflected by the cholesteric reflective material is determined by concentrations of compounds in the composition of the cholesteric reflective material, without changing the compounds.

9. A structure comprising one or more of the cholesteric reflective material of claim 1 and a retarder material.

10. The structure of claim 9, comprising at least one layer comprising the reflective material and at least one layer comprising the retarder material.

11. The structure of claim 9, comprising at least two layers comprising the reflective material.

12. The structure of claim 9, comprising the retarder material, wherein the retarder material comprises a half-wavelength phase retarder.

13. The structure of claim 9, comprising a stack comprising at least two layers comprising the reflective material and at least one layer comprising the retarder material between the at least two layers comprising the reflective material.

14. The structure of claim 13, comprising a plurality of stacks.

* * * * *